(No Model.) 5 Sheets—Sheet 4.

C. C. SMALL.
NAIL SELECTING AND DISTRIBUTING MACHINE.

No. 577,212. Patented Feb. 16, 1897.

Witnesses.
Fred S. Greenleaf
Thomas J. Drummond

Inventor.
Chester C. Small.
By Crosby & Gregory
attys.

(No Model.)

C. C. SMALL.
NAIL SELECTING AND DISTRIBUTING MACHINE.

No. 577,212. Patented Feb. 16, 1897.

Witnesses.
Fred S. Greenleaf.
Thomas J. Drummond.

Inventor
Chester C. Small.
by Crosby & Gregory
attys.

UNITED STATES PATENT OFFICE.

CHESTER C. SMALL, OF NEWTON, MASSACHUSETTS, ASSIGNOR TO JAMES W. BROOKS, PRINCIPAL TRUSTEE, OF PETERSHAM, AND JOHN BROOKS, ASSOCIATE TRUSTEE, OF CAMBRIDGE, MASSACHUSETTS.

NAIL SELECTING AND DISTRIBUTING MACHINE.

SPECIFICATION forming part of Letters Patent No. 577,212, dated February 16, 1897.

Application filed February 27, 1896. Serial No. 581,022. (No model.)

*To all whom it may concern:*

Be it known that I, CHESTER C. SMALL, of Newton, in the county of Middlesex and State of Massachusetts, have invented an Improvement in Nail Selecting and Distributing Machines, of which the following description, in connection with the accompanying drawings, is a specification, like letters on the drawings representing like parts.

This invention has for its object to provide a novel machine for selecting or distributing nails or equivalent fastenings preparatory to their use in machines for automatically setting or driving the same, the object being to convey the nails to the driving mechanism all pointing in one direction.

In my invention I have provided, in connection with a suitable race or guide way, what I have chosen to designate as a "selecting-aperture," said aperture being arranged in the path of the nail and being so constructed that a nail traveling down the race head first will enter the aperture, while nails traveling point first will not enter the aperture, but may pass into driving position. The nails which started down the raceway head first and which entered the aperture are returned into position to be again acted upon by a lifter and put again on the raceway, and I have provided means whereby the nails entering the said aperture may be directed backwardly to the lifters with their heads leading, the said nails following one another in suitable channels end to end, said nails when again put by the lifters on the raceways having their points leading.

My invention further comprehends the employment, with a raceway, of a stop or abutment located at a distance from the end of the race or guide way less than the length of the nail, the stop receiving against it the points of only those nails which move down the race or guide way point first, the stop arresting such nails temporarily. Each stop-surface is made movable, so that it, when desired, may be put into an inoperative position, that is, from a position where it will stop the nails which come point first into position where it will not so stop such nails, and by such change of stop-surface from operative into inoperative position I prevent the feeding of nails from the race or guide ways into the distributing-raceway or other devices to retain them until driven. I have devised a separating-lifter having a series of nail-receiving grooves which coöperate with the series of raceways to receive nails, one from each raceway, and the separating-lifter provided with a series of nails is moved to lift those nails into position, from which the series may slide therefrom and continue their movement down the raceways.

My invention further comprehends various details of construction to be hereinafter described, and which, with the above features of my invention, will be specifically pointed out in the claims at the end of this specification.

In the drawings, Fig. 3, a vertical section on the dotted line $x\,x$, Fig. 2; Fig. 5, a diagrammatical sectional view illustrating certain of the parts, Fig. 3, in different position; Figs. 6 and 7, details of the lifting devices to be referred to; Figs. 8 and 9, details respectively showing the cams for vertically reciprocating the lifters to be referred to; Fig. 10, a section of the raceway on the line $x^4$, Fig. 5.

Referring to the drawings in the embodiment of my invention herein selected for illustration, the main frame A is and may be of suitable or desired construction to sustain the working parts, said frame, as shown, being provided at one side with suitable bearings for a driving-shaft $a$, (see Fig. 4,) provided outside the frame with a suitable driving-pulley $a'$ and inside of the frame with a pinion $a^2$, (see Fig. 3,) in mesh with and driving a larger toothed wheel $a^3$, loosely mounted upon a pin or stud $a^4$, (see Figs. 3 and 4,) mounted in the frame directly above the shaft $a$, and upon which is loosely mounted but fast with the wheel $a^3$ a pinion $a^5$, in mesh with and driving a toothed wheel $a^6$, fast on the cam-shaft $a^7$, journaled in suitable bearings in the frame.

The main frame A has suitable bearings to sustain a table B, which is reciprocated by or through a pitman $b$, pivoted to it at $b^\times$, a strap at one end of the pitman embracing an eccentric $b'$, carried by the shaft $b^2$, journaled in suitable bearings in the frame above the stud $a^4$ referred to and having a suitable driving-pulley $b^3$ by which it may be rotated.

The movable table B, as herein shown, is provided with two series of inclined raceways $c$ and $d$, the ones $c$ being hereinafter designated as the "receiving - raceways" and the ones $d$ as the "distributing - raceways," the delivery ends or extensions of the receiving - raceways extending slightly beyond and overlapping the upper ends of the distributing - raceways $d$. These raceways will preferably be provided at their upper edges with shallow longitudinal grooves, preferably V-shaped in cross-section, as best shown at $c'$, Figs. 7 and 10.

Fixed upon the table B and arranged adjacent to and normally below the delivery ends of the series of receiving-raceways $c$ is an inclined hopper $h$, having its surface made into narrow channels $n^3$ by the application of thin plates or ribs $n^{3\times}$, the said hopper having in its bottom at one end a plurality of slots to receive the primary nail-feeding devices, shown as segmental lifters $h'$, (shown best in Figs. 3 and 5,) and at its other end an inclined wall $n^4$. The primary lifters are supported at their opposite ends by suitable rods $h^2 h^3$, carried by outside arms $h^4$, arranged at opposite sides of the machine, said arms being connected across the machine by a bar $h^5$ and bolt $h^6$ to thus form a rigid structure, the arms $h^4$ being sustained by the downwardly and rearwardly inclined arms $h^7$, (see Fig. 3,) loosely journaled upon a shaft $h^8$, suitably supported upon the movable table B.

Each of the lifters $h'$ is provided at its upper end with a thin division-plate $h^9$, and at each side said plate the lifter is beveled inwardly and downwardly to form a trough $h^{18}$. When these lifters $h'$ are in their lowermost positions, Fig. 3, their trough-like portions fill the slots in the bottom of the hopper, and they occupy a position in said slots slightly below the level of the hopper-bottom, as shown in dotted lines, Fig. 3, with the division-plate $h^8$ extended into the hopper. There are two troughs at the upper end of each lifter, one at each side of the thin division-plate thereon, one wall of each trough being formed by one side of the division-plate, the other by the inclined top face of the lifter.

Figure 1:
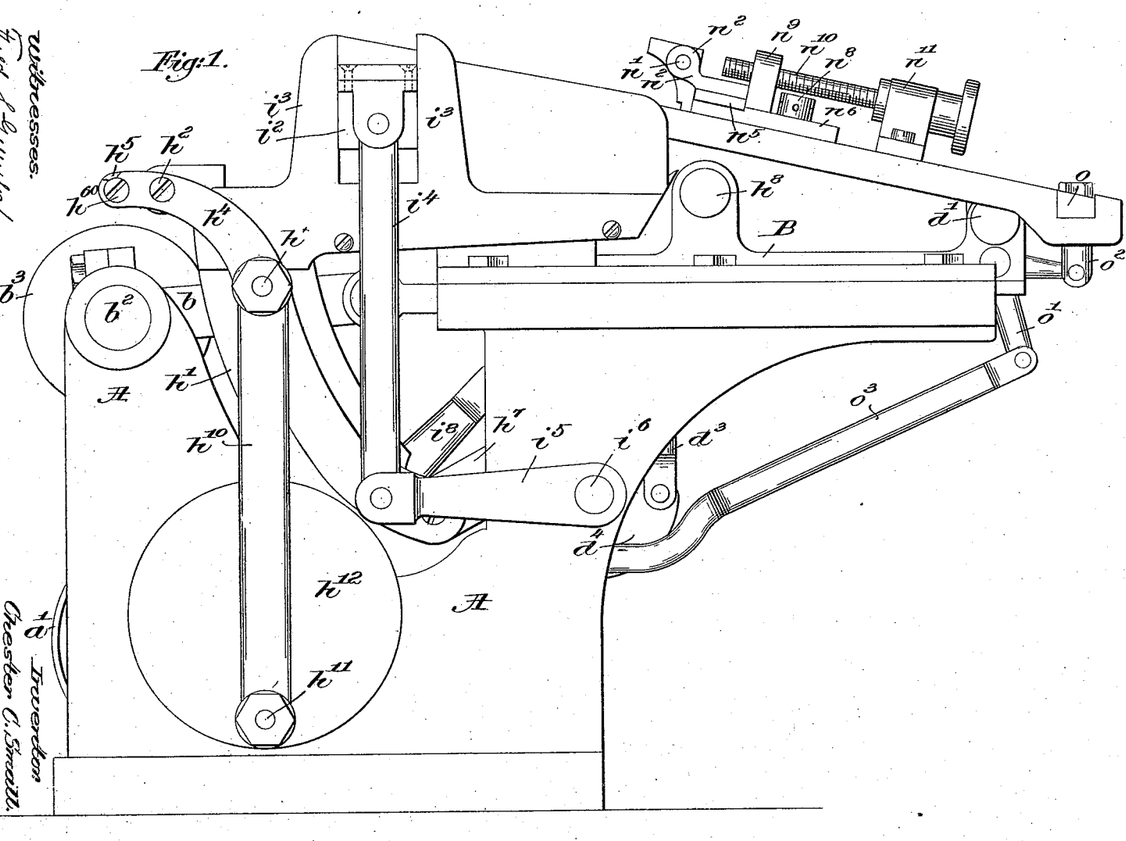
Figure 1 is a side elevation of a machine containing one embodiment of my invention.
Figures 3, 8, 9:
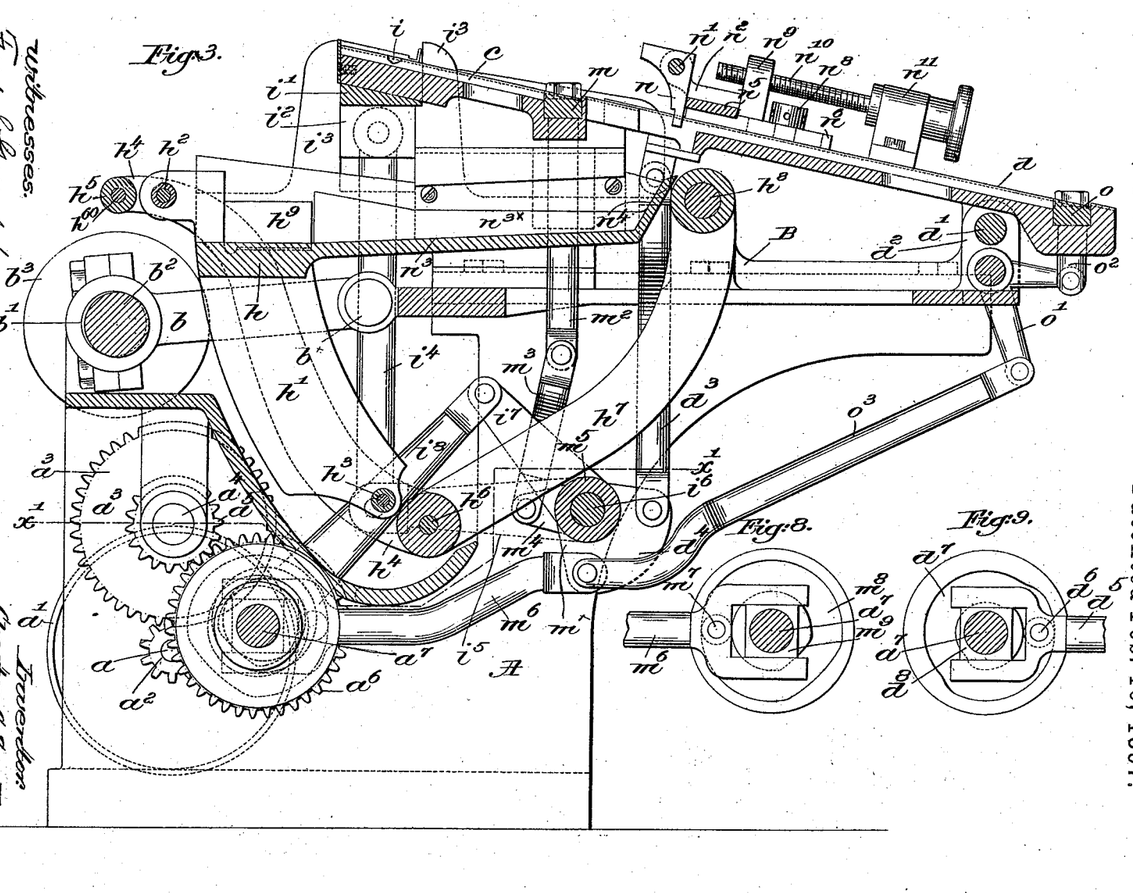
Figure 4:
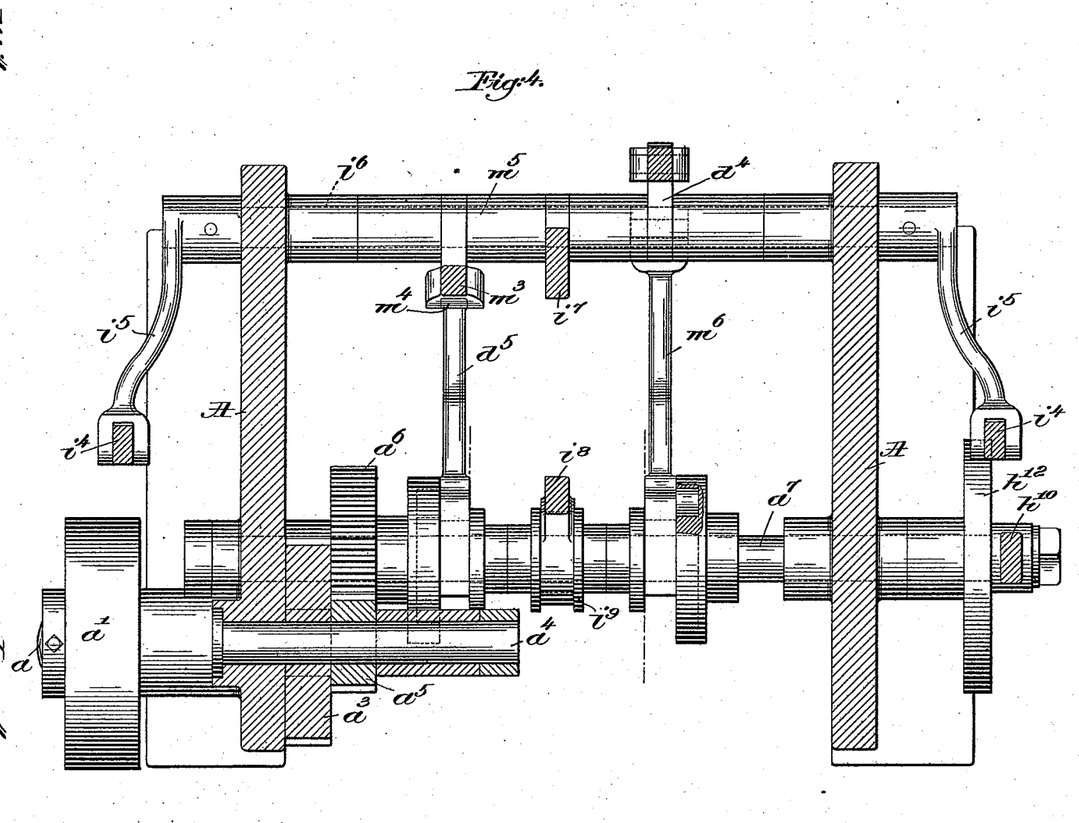
Fig. 4, a horizontal section on the dotted line $x'\,x'$, Fig. 3.

One of the side arms $h^4$ (see Fig. 1) is by a suitable pin $h^\times$ connected to a link $h^{10}$, in turn connected with the crank-pin $h^{11}$ of a crank or disk $h^{12}$, fast on the outer end of the cam-shaft $a^7$, so that at each rotation of the said cam-shaft the link $h^{10}$ will elevate the arms $h^4$ and take up with them the series of lifters $h'$, the arms $h^7$ turning about their fulcrum $h^8$ as the said lifters travel in the arc of a circle from their full-line position, Fig. 3, in which the troughs are at or below the hopper-bottom into their elevated position. (Shown in full lines, Fig. 5.)

Figure 2:
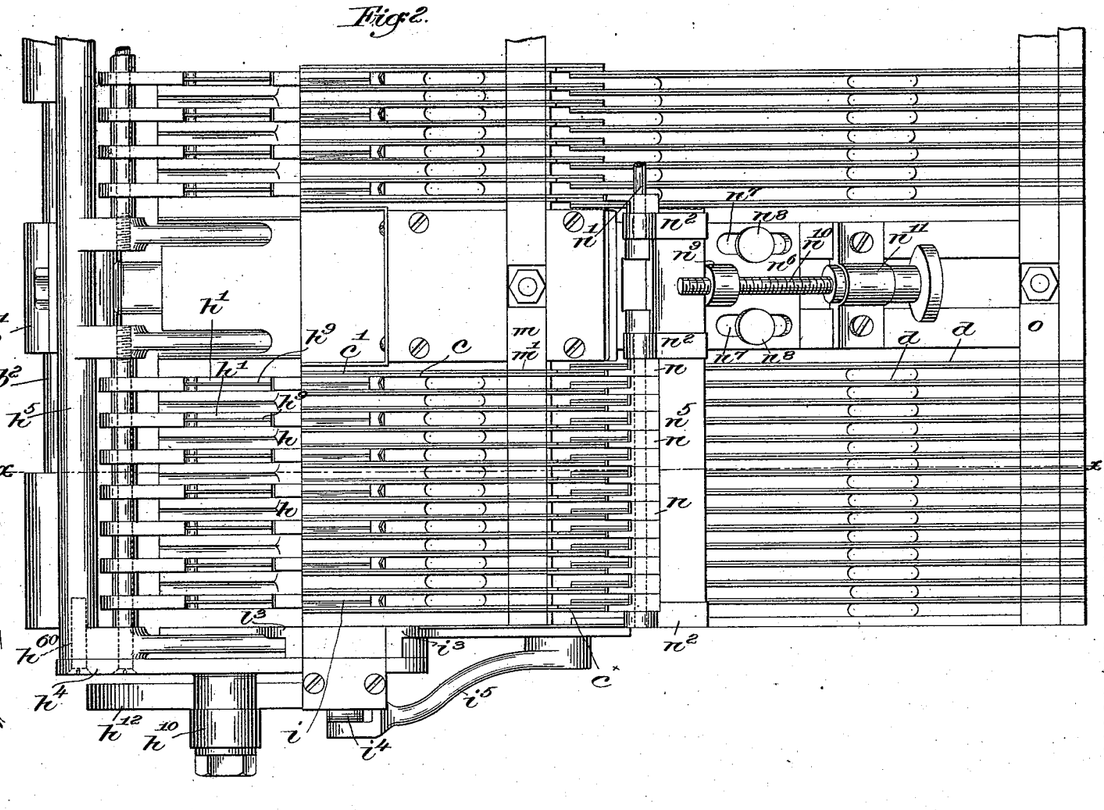
Fig. 2, a partial plan or top view of the machine shown in Fig. 1.
Figures 5, 6, 7, 10:
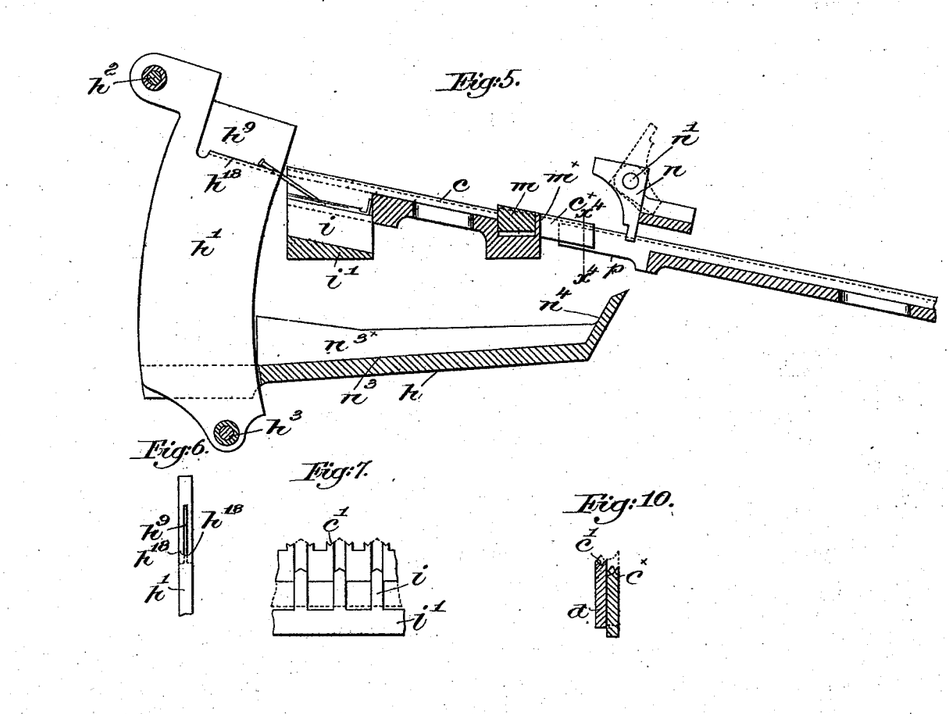

In the alternate spaces (see Figs. 2, 3, and 5) between the receiving-raceways $c$ and adjacent their upper ends I have arranged a series of secondary lifters $i$, adapted to rise and fall through slots in a plate employed to support the said raceways, said lifters $i$ projecting upwardly from a common connecting-bar $i'$, Figs. 3 and 5, provided with depending guide-blocks $i^2$, (see Fig. 3,) adapted to slide in suitable guideways formed between the stationary pillow-blocks $i^3$, said guide-blocks being connected by links $i^4$ at opposite sides the machine (see Figs. 3 and 4) with the free ends of the arms $i^5$ (shown in full lines, Fig. 4, and dotted lines, Fig. 3) fast on opposite ends of a rock-shaft $i^6$, journaled in the main frame and rocked in suitable manner, the said shaft, as herein shown, having an arm $i^7$, to which is jointed one end of an eccentric-rod $i^8$, embracing and reciprocated from a suitable eccentric $i^9$, fast on the cam-shaft $a^7$. (See Fig. 4.)

Rotation of the cam-shaft $a^7$ acts through the mechanism described to vertically reciprocate the secondary lifters $i$, the latter (see Fig. 7) being made crowning or Λ-shaped at their upper ends, the said secondary lifters when down between the adjacent side walls of the slots in which they rise and fall presenting a trough with two V-shaped portions, each substantially in alinement with the V-shaped troughs of the main lifter, so that as each main lifter $h'$ rises through the bottom of the hopper filled with nails the V-shaped troughs at the top of the same and at the opposite side of the division-plate $h^9$ thereon will catch each one or more nails and raise the same, and as the said lifter rising in the arc of a circle reaches its most elevated position its upper end assumes an inclined position, enabling the nails in the troughs at the top of the main lifter to slide therefrom, as indicated in Fig. 5, onto the upper ends of the secondary lifters $i$, on which they group themselves into two V-shaped grooves formed at their tops.

The secondary lifters are moved by the cam-shaft $a^7$ from their lowermost positions, Fig. 5, into their elevated positions, Fig. 3, so that the nails deposited upon the secondary lifters, as represented in Fig. 5, are raised into position at or above the level of the elevated ends of said receiving-raceways.

As the sides of the raceways $c$ constitute the outer sides of the two troughs at the top of each secondary lifter, it will be clear that as the said secondary lifters rise above the side walls of the raceways the nails will immediately pass or slide off laterally into the trough-shaped tops (see Fig. 7) of said raceways, down which they will travel, due to the vibration of the movable frame B. The nails thus deposited in the receiving-raceways slide down the same and enter V-shaped grooves, one for each raceway, of a separating-lifter $m$, the nails being stopped by striking against a stop $m^\times$, located alongside of the lower edge of said lifter $m$, the said stop being also provided with raceway extensions $c^\times$, arranged, respectively, in alinement with the grooves of the lifter $m$ and the receiving-raceways referred to. This separating-lifter $m$ receives the nails when in its lowest position, Fig. 3, and is moved vertically from its position in said figure into the position Fig. 5, when it is desired to discharge the nails from the lifter $m$ into the raceway extension, by suitable connections, as the depending rod $m^2$ and link $m^3$, jointed to the arm $m^4$ on a sleeve $m^5$, loosely mounted on the shaft $i^6$, (see Figs. 3 and 4,) and having a depending arm to which is jointed the cam-rod $d^5$, (see Figs. 4 and 9,) provided with a roller or other stud $d^6$, traveling in a path $d^7$, fast on the cam-shaft $a^7$, said cam-rod being forked at its end to span and slide upon the guiding-block $d^8$, loose on the said cam-shaft.

The extensions $c^\times$ of the raceways $c$, which are at the right of the separating-lifter $m$ in the drawings, are somewhat above the portions of the said raceways which are at the left of said lifter, Fig. 3, so that said lifter $m$ when in its lowermost position is on a level with the raceways $c$. As the nails come down the raceways $c$ from the secondary lifters they enter the grooves in the separating-lifter and are stopped by contact with the stop $m^\times$, as described. The separating-lifter then rises and carries all these single nails, one from each raceway, to the higher level, where they are permitted to slide off onto the elevated extensions $c^\times$ of the said receiving-raceways, each of said extensions having one of its edges cut away for nearly its entire length, so that nails coming onto the extensions slide laterally against one side of the raceway $d$, (see Fig. 10,) said extensions overlapping somewhat the sides of the upper portions of the said distributing-raceways $d$, and opposite the ends of the extensions $c^\times$ and somewhat removed therefrom are the movable stops $n$, all pivoted upon a common sustaining-rod $n'$, mounted in brackets $n^2$ on the movable frame B, said stops having tail portions which depend in front of and somewhat below the raceways in line with the same, the faces of the said depending tail portions next said raceways constituting stop-surfaces, and the opening between these stop-surfaces and the adjacent ends of the raceways $c$ constitute the apertures $p$ referred to, which operate as I will now describe. Those nails which come down the raceway $c$ and onto its extension $c^\times$ head first at once tip or gravitate into said apertures $p$, and, as herein shown, they enter the hopper $h$, while those nails which come down the said raceway point first, that is, with their heavy ends last, strike the stop $n$ and slide laterally from the ends of the extension $c^\times$ against the side of the raceway $d$, and they are there held. Those nails which gravitate head first into or through the apertures fall back into the hopper $h$, having several thin walls $n^\times$ to thus constitute a series of troughs or channels $n^3$, suitably inclined, to lead the said nails, laid straight, back into position to be again acted upon by the lifters $h'$.

The end of the hopper, just below the apertures where the nails drop into it from the raceways, is provided with an inclined wall $n^4$, against which the heads or heavy ends of the nails which gravitate into or through the apertures strike, the said inclined wall deflecting the heads or heavy ends of the nails rearwardly, and they thereafter travel head first toward the main lifters $h'$, or toward the source of supply, so that when again raised to and deposited in the receiving-raceways $c$ by the lifters $h'$ they will pass down the raceway point first, and they will not gravitate into or through the apertures referred to. It now remains to transfer the nails which come down the raceway $c$ and $c^\times$ point first into the distributing-raceways $d$. To accomplish this, I have mounted the distributing-raceways $d$ on a common pivot-rod $d'$, mounted in suitable bearings $d^2$ on the front end of the movable table B, and the elevated or free ends of the said distributing-raceways, suitably united together to form a common structure, have attached to them suitable links $d^3$, jointed to a quadrant-plate $d^4$, loosely journaled upon the shaft $i^6$ and rocked by the cam-rod $m^6$, (see Figs. 4 and 8,) provided with a roller or other suitable stud $m^7$, traveling in the path-cam $m^8$, fast on cam-shaft $a^7$, said cam-rod being forked at its end to span and be guided by the guide-block $m^9$, loosely journaled on the said cam-shaft, so that by means of the cam-rod $m^6$ and its cam the elevated free ends of the distributing-raceways $d$ are caused to rise and fall from their full-line positions Figs. 3 and 10 into their full-line positions Fig. 5.

Referring to Fig. 10, it will be seen that the portion $c^\times$ of the receiving-raceway at its upper edge has one of the sides of its V-shaped trough or channel removed, so that the nail resting thereon with its point end first and with its point against a stop $n$ (shown in Fig. 5) will lie above an aperture $p$, as described, and the nail will rest against and be retained in position by contact with the adjacent side wall of the distributing-raceway $d$, then in its elevated position, (see Fig. 10,) and as the said raceway $d$ is dropped by the mechanism described into a position below the level of the portion $c^\times$ the nail supported upon the latter is permitted to roll or pass off laterally upon or into the grooved top of the distributing-raceway down which it travels.

At the lower ends of the distributing-raceways I have provided a lifter $o$, similar in construction and in its movements to the lifter $m$ described, said lifter $o$ being actuated in suitable manner, as, for instance, by means of the bell-crank lever $o'$, having one arm jointed to the rod $o^2$, depending from the lifter, and its other arm connected by a link $o^3$ with the quadrant $d^4$.

From the foregoing it will be understood that the nails taken from the source of supply by the main lifters $h'$ are deposited upon the secondary lifters $i$, which latter raise the nails above and permit them to roll off at either side into the raceways $c$, down which they travel to the separating-lifter $m$, which takes the nails singly, one from each raceway, to and to deposit the same on a higher portion or extension $c^\times$ of said receiving-raceways, down which they slide, those nails which slide head first passing from the ends of said portions and gravitating into or through the apertures referred to, entering the channels $n^3$, which return them in reversed position to the source of supply, those nails which come down the raceway $c^\times$ point first contacting with the stop-surfaces referred to and remaining supported in horizontal positions above the said apertures, they being prevented from rolling off sidewise by the sides of the raceways $d$. On the arrival of the nails at the lifter $o$ series of them are taken, one at a time, from each raceway $d$, and in practice they will be discharged into suitable conduits or tubes, (not shown,) they leading to any point desired. The brackets $n^2$, carrying the pivot-rod $n'$, on which the stops $n$ are hung, are herein shown as mounted upon an adjustable cross-bar $n^5$, having an attached plate $n^6$, slotted at $n^7$ to receive clamping bolts or screws $n^8$. (See Figs. 2 and 3.) This plate $n^6$, carrying the cross-bar, is provided with a lug $n^9$, adapted to receive the threaded adjusting-screw $n^{10}$, loosely mounted but held against longitudinal movement in a lug $n^{11}$, fast on the plate supporting the distributing-raceways, so that by rotating this screw the cross-bar carrying the several pivoted stops may be moved to vary the distance between the stop-surfaces and the ends of the adjacent receiving-raceways, according to the length of the nail.

When all the stops $n$ are in their full-line positions, Figs. 3 and 5, all nails which come down the raceway point first will be stopped and afterward transferred laterally onto the distributing-raceways, but by turning any of the stops into their elevated or dotted position, Fig. 5, all nails which travel down the receiving-raceways to such stops, whether head first or point first, will gravitate into the selecting-apertures and be transferred to the source, so that by swinging into their elevated positions any desired number of stops the raceways with which such stops coöperate will for the time being be thrown out of action.

My invention is not limited to the particular construction herein shown and described, for it is evident that the same may be varied without departing from the spirit and scope of my invention.

Having described one embodiment of my invention, and without limiting myself as to details, what I claim, and desire to secure by Letters Patent, is,—

1. In a machine of the class described, the combination with raceways arranged one near the end of the other in the direction of their length to receive and guide a series of nails, and feeding devices to supply the raceways with nails; of nail-selecting apertures occupying a position in the line of travel of the nails from one to the other of said raceways, into which apertures only those nails which travel head first in said raceways may gravitate and be discharged from said raceways, while those nails traveling point first continue their travel in the said raceways, substantially as described.

2. In a machine of the class described, the combination with raceways arranged one near the end of the other in the direction of their length to receive and guide a series of nails, and feeding devices to supply the raceways with nails; of nail-selecting apertures occupying a position in the line of travel of the nails from one to the other of said raceways, into which apertures only those nails which travel head first in said raceways may gravitate and be discharged from said raceways, while those nails traveling point first continue their travel in the said raceways, and with means to direct the return of the nails entering said apertures into position to be again fed to the raceways, substantially as described.

3. In a machine of the class described, the combination with nail-feeding devices, raceways to receive a series of nails therefrom, and nail-selecting apertures arranged in the line of travel of the nails and into which only those nails which travel head first in said raceways gravitate, to thereby select and separate such nails from those which travel point first in the same raceway, of an inclined wall to reverse the nails entering said apertures, and means to guide the said nails in their return passage to the said feeding devices whereby said nails when again put on the raceway will have their points leading, substantially as described.

4. In a machine of the class described, a hopper to contain nails; a nail-feeding device; raceways to which a series of said nails are fed, and selecting-apertures arranged in the line of travel of the nails and into which only those nails which travel head first down said raceways gravitate to thereby select and separate such nails from those which travel point first on said raceways, combined with return channels or conduits having inclined bottoms and in communication with said apertures, whereby the nails entering said return-channels are returned to be again acted upon by said feeding device, substantially as described.

5. In a machine of the class described, a series of raceways, and nail-selecting apertures arranged in the line of travel of the nails into which only those nails which travel head first on said raceways may gravitate to thereby select and separate such nails from those which travel point first on the said raceways, combined with means to temporarily arrest all the nails traveling down said raceways point first and a second series of raceways and means to effect the transfer of the stopped nails to the second series of raceways down which they continue to travel point first, substantially as described.

6. In a machine of the class described, the combination with a raceway, of a nail-selecting aperture arranged in the line of travel of the nails, and means at will to cause all the nails or those only which travel head first to gravitate into or through said selecting-aperture, substantially as described.

7. In a machine of the class described, the combination with a raceway, of a nail-selecting aperture arranged in the line of travel of the nails, a stop-surface arranged at that side said aperture which is opposite said raceway to stop those nails which travel down the raceway point first before they can gravitate into or through said aperture, while permitting those which come head first to gravitate, and means to move said stop-surface from such operative position to permit the nails which travel point first to also gravitate into or through said aperture, substantially as described.

8. In a machine of the class described, the combination with a raceway, of a nail-selecting aperture arranged in the line of travel of the nails, and a swinging stop-surface arranged in the line of and slightly removed from the end of said raceway, to operate substantially as described.

9. In a machine of the class described, the combination with a raceway, of a nail-selecting aperture arranged in the line of travel of the nails, and a stop-surface arranged in the line of and somewhat removed from the end of said raceway, to operate substantially as described, and means to change the relative position of said raceway end and stop-surface at will for different lengths of nails, substantially as described.

10. In a machine for assorting nails the following instrumentalities, viz: a series of raceways to receive and guide nails with their points and heads arranged indiscriminately; a lifter arranged across the said receiving-raceways near their ends and provided with a series of grooves in line with the raceways each to receive a lowermost nail from one of said raceways, means to raise said lifter to cause it to raise the series of nails lodged on it and permit them to pass to the extremities or delivery ends of said raceways, substantially as described.

11. In a machine of the class described, the combination with a series of main raceways and extension-raceways arranged at a different level; of an interposed lifter provided with a series of transverse grooves to receive nails from the main raceways; a stop to arrest the nails in said lifter; and means to elevate the lifter and carry the series of nails thereon to the level of the said extension-raceways, substantially as described.

12. In a machine of the class described, a raceway, a nail-selecting aperture arranged in the line of travel of the nails into which those nails which travel head first in the said raceway may gravitate to thereby select and separate such nails from those which travel point foremost into said raceway, combined with a distributing-raceway, and means to insure the lateral transfer thereto of the nails traveling point first, substantially as described.

13. In a machine of the class described, the combination with a raceway having a trough-like top to conduct nails, a portion of one side of the trough being removed adjacent the end of said raceway, of a nail-selecting aperture arranged in the line of travel of the nails and into which those nails alone which travel head first in said raceway may gravitate to thereby select and separate such nails from those which travel point first in the same raceway, a second raceway arranged at the side of said first-mentioned raceway, its side wall constituting a wall for said trough at that point or points where the normal wall of said trough is removed, and means to change the relative positions of the said raceways and cause one to disappear below the level of the other to thereby permit a nail carried by one to move transversely upon the other, substantially as described.

14. In a machine of the class described, the combination with a raceway having a longitudinally-grooved top and a secondary lifter having its upper edge tapering downwardly or inclined toward the side of the said raceway, the lifter, when in its lowered position, presenting a trough between its inclined edge and the side of the raceway to receive and hold a nail, of means to move said lifter and cause it to lift a nail or nails to the level of the said raceway to thereby enable the nail or nails lifted by it to move laterally off the inclined top of the lifter into the groove of the raceway, substantially as described.

15. In a machine of the class described, the combination with a pair of raceways having longitudinal grooved tops, of a single lifter arranged between the said raceways and having downwardly-inclined surfaces extending from a middle point at the top of said lifter in opposite directions toward the sides of said raceways, whereby said sides constitute with said downwardly-inclined surfaces, troughs in which to deposit nails, the latter passing transversely from the lifter upon said raceways as the said lifter is raised above the raceway, substantially as described.

16. In a machine of the class described, the combination with a raceway and means to move it to aid in causing the nails to travel in the raceway, of a selecting-aperture arranged in the line of travel of the nails, and into which those nails alone which travel head first in said raceway may gravitate, to thereby select and separate such nails from those which travel point first in said raceway, substantially as described.

In testimony whereof I have signed my name to this specification in the presence of two subscribing witnesses.

CHESTER C. SMALL.

Witnesses:
 GEO. W. GREGORY,
 MARGARET ALICE DUNN.